3,803,223
3-AMINO-N-SUBSTITUTED SUCCINAMIC ACIDS AND INTERMEDIATES THERETO

Robert H. Mazur, Deerfield, and James M. Schlatter, Glenview, Ill., and Arthur H. Goldkamp, Bellevue, Wash., assignors to G. D. Searle & Co., Chicago, Ill.
No Drawing. Filed July 20, 1970, Ser. No. 56,753
Int. Cl. C07c 101/12
U.S. Cl. 260—534 R          6 Claims

ABSTRACT OF THE DISCLOSURE 3-amino-N-substituted succinamic acids useful in view of their potent sweetening properties and, in addition, their pharmacological activity, e.g. anti-inflammatory.

---

The present invention is concerned with novel derivatives of 3-aminosuccinamic acid which can be represented by the following structural formula $$\begin{array}{c} \text{COOH} \\ | \\ \text{CH}_2 \\ | \\ \text{CH—NH}_2 \\ | \\ \text{C—NRR}' \\ \| \\ \text{O} \end{array}$$

wherein R is hydrogen or a methyl radical and R' is a radical selected from the group consisting of $$\begin{array}{c} C_nH_{2n+1} \\ \text{X} \\ | \\ \text{—Alk—Y} \end{array}$$

Alk being a lower alkylene radical, $n$ a positive integer greater than 6 and less than 9, X being hydrogen or hydroxy, and Y a radical selected from the group consisting of cyclohexyl, naphthyl, furyl, pyridyl, indolyl and those of the formulas

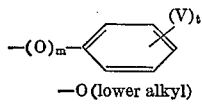

—O (lower alkyl)

wherein $m$ is a member of the class consisting of 0 and 1, $t$ is a positive integer less than 3, V is hydrogen, a hydroxy, lower alkoxy, 3,4-methylenedioxy or halo radical in which the halogen possesses an atomic weight less than 36 with the provision that when V is hydrogen, Alk is a lower alkylene radical of greater than one carbon atom, or NRR' represents a 2-phenyl-3-methylmorpholino radical.

The lower alkylene radicals represented by Alk in the foregoing structural representation are typified by methylene, ethylene, trimethylene, tetramethylene, pentamethylene and the corresponding branched-chain isomers.

Typical of the lower alkyl radicals encompassed in that structural formula are methyl, ethyl, propyl, butyl, pentyl, hexyl, heptyl and the branched-chain isomers thereof.

The lower alkoxy radicals denoted in that formula are, for example, methoxy, ethoxy, propoxy, butoxy, pentyloxy, hexyloxy, heptyloxy and the branched chain groups isomeric therewith.

The compounds of this invention are conveniently obtained by a two-step process involving coupling of a suitable L-aspartic acid derivative, wherein protecting groups are attached to the amino and β-carboxy groups, with the appropriate amine, followed by removal of the protecting groups, suitably by catalytic hydrogenolysis. Examples of suitable starting materials are β-benzyl N-benzyloxycarbonyl-L-aspartate and active esters thereof such as N-benzyloxycarbonyl-L-aspartic acid α-p-nitrophenyl, β-benzyl diester. When the starting material contains the free α-carboxy group, the reaction is carried out in the presence of an alkyl chloroformate and a suitable organic base. β-Benzyl-N-benzyloxycarbonyl-L-aspartate is thus allowed to react, for example, with DL-1,4-dimethylpentylamine in the presence of isobutyl chloroformate and N-methylmorpholine to yield benzyl 3-benzyloxycarbonylamino - N - DL-1',4'-dimethylpentyl-L-succinamate. The use of an active ester is exemplified by the reaction of N-benzyloxycarbonyl-L-aspartic acid p-nitrophenyl, β-benzyl diester with DL-2-amino-1-phenylpropanol to afford benzyl 3-benzyloxycarbonyl-amino-N-DL-1'-methyl-2'-hydroxyphenethyl - L - succinamate.

Removal of the protecting groups of the aforementioned novel intermediates is most conveniently achieved by catalytic hydrogenolysis, preferably by use of a palladium black catalyst. When benzyl 3-benzyloxycarbonyl-amino-N-DL-1'-methyl-2'-hydroxyphenethyl - L - succinamate, for example, is shaken in methanol with hydrogen in the presence of palladium black at room temperature and about 3 atmospheres pressure, 3-amino-N-DL-1'-methyl-2'-hydroxyphenethyl-L-succinamic acid is produced.

An alternate process for production of the instant compounds utilizes the N-carboxy anhydride of L-aspartic acid as the starting material. That substance is prepared from L-aspartic acid by reaction with phosgene in dioxane according to the general procedure described by Farthing, A. C., J. Chem. Soc., 1950, 3213. The N-carboxy anhydride is coupled with the appropriate amine in aqueous medium at a pH of about 10 according to the general procedure described by Hirschmann et al., J. Org. Chem., 32, 3415 (1967). This alternate procedure offers the advantage of obviating the steps involving the addition and subsequent removal of protecting groups. A specific illustration is the reaction of L-aspartic acid N-carboxy anhydride with DL-1,4-dimethylpentylamine to afford 3-amino-N-DL-1',4'-dimethylpentyl-L-succinamic acid.

The 3-amino-N-substituted succinamic acids of the invention are surprisingly and unexpectedly characterized by a sweet taste, thus are useful for the purpose of imparting that taste to food products. These compounds can thus be added to food products such as fruits, vegetables, juices, meat products such as ham or bacon, sweetend milk products, egg products, salad dressings, ice creams and sherbets, gelatins, icings, syrups, cake mixes and beverages such as carbonated soft drinks and wines.

The preparation of a typical sweetened orange soda is described as follows:

A stock supply of bottler's syrup is prepared by mixing 5.5 ml. of a 50% aqueous citric acid solution with 150 ml. of water, dissolving 2 g. of 3-amino-N-DL-1',4'-dimethylpentyl-L-succinamic acid in that solution, adding successively 7.02 ml. of the orange flavor base manufactured by A. E. Illes, Dallas, Tex., labeled FO-78, and 2.7 g. of sodium benzoate and diluting that mixture to 200 ml. with water. One oz. samples of that bottler's syrup are transferred to 6 oz. bottles and 110 ml. of cold tap water is added to each bottle. To each bottle 42 ml. of cold charged bottling water (5 volumes carbon dioxide) is then added to achieve carbonation. Each bottle is capped and the contents mixed.

The latter preparation possesses a sweetness comparable to that containing a quantity of sucrose 50 times that of the name succinamic acid derivative.

The instant sweetening agents are stable substances and can be utilized in a variety of physical forms, e.g. as powders, tablets, syrups, etc. Liquid or solid carriers such as water, glycerol, starch, sorbitol, salt, citric acid and other suitable nontoxic substances can be used also. These agents are particularly useful as sugar substitutes for diabetics. They are, moreover, advantageous over synthetic sweetening agents such as saccharin and cyclamate by virtue of the absence of an unpleasant after-taste.

It has been determined that the sweetening property of the instant compounds is highly dependent upon the stereochemistry of the molecule. The corresponding D-aspartic acid and D-amine derivatives are thus totally lacking in that property.

The 3-amino-N-substituted succinamic acids of this invention are, furthermore, useful as pharmacological agents, as is evidence, for example, by their anti-inflammatory properties. For that purpose, these substances can be administered in conventional pharmaceutical forms and by conventional routes. Solid forms such as pills, powders, capsules, tablets and the like and liquid forms such as syrups, emulsions, elixirs, suspensions and the like are suitable for oral administration, while aqueous solutions or suspensions or solutions in pharmacologically acceptable oil or oil-water emulsions are suitable for parenteral administration. Suitable excipients can also be added.

The pharmacological activity of the instant 3-amino-N-substituted succinamic acids is specifically illustrated by the anti-inflammatory response produced by the following representative compounds when administerer subcutaneously to rats at a dose of 25 mg.:

3-amino-N-D-1'-methylphenethyl-L-succinamic acid
3-amino-N-L-1'-methylphenethyl-L-succinamic acid
3-amino-N-phenethyl-L-succinamic acid
3-amino-N-DL-1'-methyl-2'-hydroxyphenethyl-L-succinamic acid
3-amino-N-DL-1'-methylhexyl-L-succinamic acid
3-amino-N-DL-1'-methyl-4''-hydroxyphenethyl-L-succinamic acid
3-amino-N-DL-1'-ethylpentyl-L-succinamic acid
3-amino-N-DL-1'4'-dimethylphentyl-L-succinamic acid.

The anti-inflammatory activity of the latter compounds was determined by the following assay:

Each of a group of 10 intact male rats weighing 100–130 grams is injected, under the plantar surface of each hind foot, with 0.1 ml. of a 1% solution of carrageenin (Type 402, Marine Colloids, Inc.). The test compound, dissolved or suspended in saline, corn oil or propylene glycol, is administered subcutaneously one hour prior to the carrageenin injection. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degree centigrade (° C.) and quantities of materials in parts by weight unless otherwise noted.

EXAMPLE 1

A solution containing 17.85 parts of β-benzyl N-benzyloxycarbonyl-L-aspartate, 5.9 parts by volume of N-methylmorpholine and 76.5 parts of anhydrous tetrahydrofuran is cooled to approximately −20° and 7 parts by volume of isobutyl chloroformate is added dropwise with vigorous stirring while the temperature is maintained between −10 and −15°. Stirring at that temperature is continued for about 5 minutes, at the end of which time the mixture is cooled to approximately −30°. At that point, 8.25 parts by volume of DL-1,4-dimethylpentylamine is added dropwise with vigorous stirring while the temperature is maintained between −10 and −15°. After that addition is complete, the reaction mixture is kept at approximately 5° for about 16 hours. The reaction mixture is then diluted with ethyl acetate, washed successively with dilute hydrochloric acid, dilute aqueous sodium sulfate and dilute aqueous potassium bicarbonate, then dried over anhydrous sodium sulfate and stripped of solvent under reduced pressure. The resulting residual crude product is purified by trituration with hexane to afford benzyl 3-benzyloxycarbonylamino - N - DL-1',4'-dimethylpentyl-L-succinamate, melting at about 90–103°. This compound exhibits an optical rotation, in methanol, of −7°.

EXAMPLE 2

To a solution of 4.53 parts of DL-2-amino-1-phenylpropanol in 22.5 parts of dimethylformamide is added 15.06 parts of N-benzyloxycarbonyl-L-aspartic acid α-p-nitrophenyl, β-benzyl diester and the resulting reaction mixture is stirred for a few minutes until homogeneous, then is allowed to stand at room temperature for about 16 hours. At the end of that reaction period the mixture is diluted with ethyl acetate, then washed successively with dilute hydrochloric acid, water, dilute aqueous potassium bicarbonate and dilute aqueous sodium sulfate, and dried over anhydrous sodium sulfate, then stripped of solvent by distillation under reduced pressure. The residue thus obtained is triturated with cyclohexane to afford the crude product, melting at about 70–80° and that crude material is further purified by recrystallization from aqueous isopropyl alcohol to afford benzyl 3-benzyloxycarbonylamino-N-DL-1'-methyl-2'-hydroxyphenethyl - L - succinamate, melting at about 72–84° and displaying an optical rotation, in methanol, of −9°.

EXAMPLE 3

A mixture containing 4.9 parts of benzyl 3-benzyloxycarbonylamino-N-DL-1'-methyl - 2' - hydroxyphenethyl-L-succinamate, 0.5 part of palladium black and 120 parts of methanol is shaken with hydrogen at room temperature and approximately 4 atmospheres pressure until 2 molecular equivalents of hydrogen have been absorbed. The catalyst is then removed by filtration and the methanol distilled under reduced pressure to afford the residual crude product. Purification of that material by trituration with ether yields pure 3-amino-N-DL-1'-methyl-2'-hydroxyphenethyl-L-succinamic acid, melting at about 188–190°. This compound exhibits an optical rotation, in water, of +10° and is represented by the following structural formula

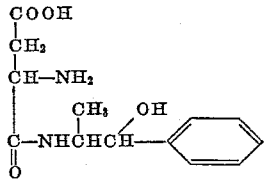

EXAMPLE 4

The substitution of 3.99 parts of DL-2-phenylcyclopropylamine in the procedure of Example 2 results in benzyl 3-benzyloxycarbonylamino-N-DL-2'-phenylcyclopropyl-L-succinamate, which, after recrystallization from isopropyl alcohol, melts at about 80–92° and exhibits an optical rotation, in methanol, of −13°.

EXAMPLE 5

The substitution of 5.84 parts of DL-2-phenyl-3-methylmorpholine and 10.71 parts of β-benzyl N-benzyloxycarbonyl-L-aspartate in the procedure of Example 1 results in the β-benzyl ester of N-benzyloxycarbonyl-L-aspartic acid DL-2-phenyl-3-methylmorpholide, which exhibits an optical rotation, in methanol, of −35°.

EXAMPLE 6

When 3.8 parts of DL-1-methylhexylamine and 10.71 parts of β-benzyl N-benzyloxycarbonyl-L-aspartate are allowed to react according to the procedure of Example 1, there is obtained, after recrystallization from cyclohexane-hexane, benzyl 3-benzyloxycarbonylamino-N-DL-1'-methylhexyl-L-succinamate, melting at about 65–69° and exhibiting an optical rotation, in methanol, of —6°.

EXAMPLE 7

The substitution of 4.53 parts of DL-1- methyl-4'-hydroxyphenethylamine in the procedure of Example 2 affords benzyl 3-benzyloxycarbonylamino-N-DL-1'-methyl-4''-hydroxyphenethyl-L-succinamate, which, after recrystallization from cyclohexane, melts at about 106–117° and exhibits an optical rotation, in methanol, of —9.5°.

EXAMPLE 8

When 18.74 parts of β-benzyl N-benzyloxycarbonyl-L-aspartate, 11.09 parts of DL-1-methyl-2-(α-naphthyl)ethylamine, 5.7 parts of ethyl chloroformate and 12.3 parts by volume of N-methylmorpholine are allowed to react by the procedure of Example 1, there is produced benzyl 3-benzyloxycarbonylamino - N - DL - 1' - methyl-2'-(α-naphthyl)ethyl-L-succinamate, melting at about 121–136°.

EXAMPLE 9

When 6.33 parts of n-heptylamine is substituted in the procedure of Example 1, there is produced, after recrystallization from isopropyl alcohol, benzyl 3-benzyloxycarbonylamino-N-n-heptyl - L - succinamate, melting at about 92–93° and exhibiting an optical rotation, in methanol, of —6°.

EXAMPLE 10

The substitution of 6.33 parts of DL-1-ethylpentylamine in the procedure of Example 1 results in benzyl 3-benyloxycarbonylamino-N-DL-1'-ethylpentyl - L - succinamate, which, after recrystallization from hexane, melts at about 91–98° and exhibits an optical rotation, in methanol, of —9°.

EXAMPLE 11

The reaction of 14.2 parts of DL-1-methyl-2-(2'-thienyl)ethylamine, 28.6 parts of β-benzyl N-benzyloxycarbonyl-L-aspartate, 8.72 parts of ethyl chloroformate and 18.8 parts by volume of N-methylmorpholine according to the procedure of Example 1 results in benzyl 3-benzyloxycarbonylamino-N-DL-1'-methyl - 2' - (2'' - thienyl)ethyl-L-succinamate.

EXAMPLE 12

When 7.1 parts of DL-1-methylheptylamine is substituted in the procedure of Example 1, there is produced, after recrystallization from hexane, benzyl 3-benzyloxycarbonyl amino-N-DL-1'-methylheptyl - L - succinamate, melting at about 78–82°, and exhibiting an optical rotation, in methanol, of —3°.

EXAMPLE 13

The reaction of 15.18 parts of DL-1-methyl-4'-fluorophenethylamine, 28.6 parts of β-benzyl N-benzyloxycarbonyl-L-aspartate, 8.72 parts of ethyl chloroformate and 19.3 parts of N-methylmorpholine according to the procedure of Example 1 results in benzyl 3-benzyloxycarbonylamino-N-DL-1'-methyl - 4'' - fluorophenethyl-L-succinamate, melting at about 82.5–87°.

EXAMPLE 14

When 10.05 parts of N-benzyloxycarbonyl-L-aspartic acid α-p-nitrophenyl, β-benzyl diester and 2.78 parts of phenethylamine are substituted in the procedure of Example 2, there is produced benzyl 3-benzyloxycarbonylamino-N-phenethyl-L-succinamate, which, after recrystallization from isopropyl acetate, melts at about 114–114.5° and exhibits an optical rotation, in methanol, of —10.5°.

EXAMPLE 15

The reaction of 21.5 parts of N-benzyloxycarbonyl-L-aspartic acid β-benzyl ester, 14.4 parts of DL-1-methyl-3',4'-dichlorophenethylamine, 6.54 parts of ethyl chloroformate and 14.5 parts by volume of N-methylmorpholine according to the procedure of Example 1 results in benzyl 3-benzyloxycarbonylamino-N-DL-1'-methyl - 3'',4'' - dichlorophenethyl - L - succinamate, melting at about 92–107°.

EXAMPLE 16

When 28.6 parts of β-benzyl N-benzyloxycarbonyl-L-aspartate, 16.5 parts of DL-1-methyl-4'-chlorophenethylamine, 8.72 parts of ethyl chloroformate and 19.3 parts by volume of N-methylmorpholine are allowed to react according to the procedure of Example 1, there is produced benzyl 3-benzyloxycarbonylamino - N - DL - 1'-methyl-4''-chlorophenyl - L - succinamate, melting at about 95–106°.

EXAMPLE 17

To a suspension of 150 parts of D-tartaric acid in 480 parts of methanol is added 115 parts of DL-1,4-dimethylpentylamine and the resulting solution is allowed to stand at room temperature until crystallization is complete. The crystalline product is recrystallized several times from methanol to afford optically pure D-1,4-dimethylpentylamine D-tartrate, melting at about 141–143° and exhibiting an optical rotation, in methanol, of —19.5°.

A solution of 26.5 parts of D-1,4-dimethylpentylamine D-tartrate in 8 parts of tetrahydrofuran containing 8 parts of water is diluted with approximately 180 parts of tetrahydrofuran and 10.6 parts by volume of 50% aqueous sodium hydroxide is added. The mixture is shaken; 200 parts of potassium carbonate is added, and the mixture is filtered. The filter cake is washed with tetrahydrofuran and the combined filtrates containing the free amine are used in the next step.

The tetrahydrofuran solution containing 11.5 parts of D-1,4-dimethylpentylamine is allowed to react with 35.74 parts of β-benzyl N-benzyloxycarbonyl-L-aspartate according to the procedure of Example 1, thus affording benzyl 3 - benzyloxycarbonylamino-N-D-1',4' - dimethylpentyl-L-succinamate, which, after recrystallization from aqueous isopropyl alcohol, melts at about 116–117° and exhibits an optical rotation, in methanol, of —4°.

EXAMPLE 18

The resolution of DL-1-methylhexylamine according to the procedure described in Example 17 results in D-1-methylhexylamine tartrate, melting at about 107–110° and exhibiting an optical rotation, in methanol, of —20°.

The latter salt is converted by the procedure described in Example 17 to 3.45 parts of D-1-methylhexylamine and that amine is allowed to react with 10.72 parts of β-benzyl N-benzyloxycarbonyl-L-aspartate according to the procedure described in Example 1, thus affording benzyl 3-benzyloxycarbonylamino - N - D - 1'-methylhexyl-L-succinamate which, after recrystallization from aqueous isopropyl alcohol, melts at about 98–100° and displays an optical rotation, in methanol, of —4°.

EXAMPLE 19

To a suspension of 150 parts of L-tartaric acid in 480 parts of methanol is added 115 parts of DL-1-methylhexylamine and the resulting solution is allowed to stand at room temperature until crystallization is complete. Those crystals are collected by filtration and recrystallized several times from methanol to afford optically pure L-1-methylhexylamine L-tartrate, melting at about 108–110° and exhibiting an optical rotation, in methanol, of +19°.

The latter salt is converted to the free amine by the procedure described in Example 17 and 3.45 parts of that amine, i.e. L-1-methylhexylamine, is allowed to react with 10.7 parts of β-benzyl N-benzyloxycarbonyl-L-aspartate according to the procedure described in Example 1 to afford benzyl 3 - benzyloxycarbonylamino-N-L-1'-methylhexyl-L-succinamate, which, after recrystallization from aqueous isopropyl alcohol, melts at about 96–99° and exhibits an optical rotation, in methanol, of —11°.

EXAMPLE 20

To a suspension of 150 parts of L-tartaric acid in 480 parts of methanol is added 115 parts of DL-1,4-dimethylpentylamine and the resulting solution is allowed to stand at room temperature until crystallization is complete. The crystalline salt is recrystallized several times from methanol to afford optically pure L-1,4-dimethylpentylamine L-tartrate, melting at about 142–144° and exhibiting an optical rotation, in methanol, of +20°.

The latter salt is converted to the free amine by the procedure described in Example 17 and 5.98 parts of that amine, i.e. L-1,4-dimethylpentylamine, is allowed to react with 17.8 parts of β-benzyl N-benzyloxycarbonyl-L-aspartate to afford benzyl 3-benzyloxycarbonylamino-N-L-1', 4' - dimethylpentyl-L-succinamate, which after recrystallization from aqueous isopropyl alcohol, melts at about 105–107° and exhibits an optical rotation, in methanol, of —13°.

EXAMPLE 21

The reaction of 6.6 parts of 2-indanylamine with 17.73 parts of β-benzyl N-benzyloxycarbonyl-L-aspartate according to the procedure of Example 1 results in benzyl 3 - benzyloxycarbonylamino-N-2'-indanyl-L-succinamate, which after recrystallization from isopropyl alcohol, melts at about 122–126°.

EXAMPLE 22

The reaction of 5.75 parts of DL-1,3-dimethylpentylamine with 17.8 parts of β-benzyl N-benzyloxycarbonyl-L-aspartate according to the procedure of Example 1 affords benzyl 3-benzyloxycarbonylamino-N-DL-1',3'-dimethylpentyl-L-succinamate, melting at about 61–71° and exhibiting an optical rotation, in methanol, of +105°.

EXAMPLE 23

The reaction of 3.11 parts of D-1-methylphenethylamine with 10.05 parts of N-benzyloxycarbonyl-L-aspartic acid α-p-nitrophenyl, β-benzyl diester according to the procedure of Example 2 affords benzyl 3-benzyloxycarbonylamino-N-D-1'-methylphenethyl - L - succinamate, which, after recrystallization from isopropyl acetate, melts at about 108–109.5° and exhibits an optical rotation, in methanol, of +3.5°.

EXAMPLE 24

When 3.11 parts of L-1-methylphenethylamine is allowed to react with 10.05 parts of N-benzloxycarbonyl-L-aspartic acid α-p-nitrophenyl, β-benzyl diester according to the procedure of Example 2, there is produced benzyl 3-benzyloxycarbonylamino-N-L-1' - methylphenethyl-L-succinamate, which, after recrystallization from isopropyl acetate, melts at about 118–120.5° and displays an optical rotation, in methanol, of —23.5°.

EXAMPLE 25

When 4.35 parts of L-1-methyl-2-cyclohexylethylamine is allowed to react with 10 parts of β-benzyl N-benzyloxycarbonyl-L-aspartate according to the procedure of Example 1, there is obtained benzyl 3-benzyloxycarbonylamino - N-L-1'-methyl-2'-cyclohexylethyl-L-succinamate, which, after recrystallization from hexane, melts at about 65–70° and exhibits an optical rotation, in methanol, of —18.5°.

EXAMPLE 26

The reaction of 6.16 parts of DL-1-ethylphenethylamine with 19.05 parts of N-benzyloxycarbonyl-L-aspartic acid α-p-nitrophenyl, β-benzyl diester according to the procedure of Example 2 results in benzyl 3-benzyloxycarbonylamino - N - DL-1' - ethylphenethyl-L-succinamate which, after recrystallization from isopropyl acetate-cyclohexane, melts at about 105–115° and exhibits an optical rotation, in methanol, of —11°.

EXAMPLE 27

When 5.58 parts of 2-cyclohexylethylamine is allowed to react with 20.1 parts of N-benzyloxycarbonyl-L-aspartic acid α-p-nitrophenyl, β-benzyl diester by the procedure of Example 2, there is produced benzyl 3-benzyloxycarbonylamino - N - 2' - cyclohexylethyl - L - succinamate, which after recrystallization from isopropyl acetate, melts at about 129.5–130.5° and exhibits an optical rotation, in methanol, of —2.5°.

EXAMPLE 28

When 6.86 parts of 4-hydroxyphenethylamine and 20.1 parts of N-benzyloxycarbonyl-L-aspartic acid α-p-nitrophenyl, β-benzyl diester are allowed to react according to the procedure of Example 2, there is produced benzyl 3-benzyloxycarbonylamino - N - 4' - hydroxyphenethyl - L-succinamate, which, after recrystallization from isopropyl acetate-cyclohexane, melts at about 148—149.5° and exhibits an optical rotation, in methanol, of —12°.

EXAMPLE 29

The reaction of 6.11 parts of 2-(2'-pyridyl)-ethylamine with 20.1 parts of N-benzyloxycarbonyl-L-aspartic acid α-p-nitrophenyl, β-benzyl diester by the procedure of Example 2 results in benzyl 3-benzyl-oxycarbonylamino-N-2'-(2''-pyridyl)ethyl-L-succinamate, which, after recrystallization from carbon tetrachloride, melts at about 97–105° and exhibits an optical rotation, in methanol, of —10°.

EXAMPLE 30

When 9.33 parts of DL-2-methylphenethylamine is allowed to react with 30.15 parts of N-benzyloxycarbonyl-L-aspartic acid α-p-nitrophenyl, β-benzyl diester by the procedure of Example 2, there is produced benzyl 3-benzyloxycarbonylamino - N - DL - 2' - methylphenethyl-L-succinamate, which, after recrystallization from isopropyl acetate, melts at about 72–81° and exhibits an optical rotation, in methanol, of —15.5°.

EXAMPLE 31

The reaction of 5.5 parts of 1,1-dimethyl-4'-chlorophenethylamine with 14.34 parts of N-benzyloxycarbonyl-L-aspartic acid α-p-nitrophenyl, β-benzyldiester according to the procedure of Example 2 results in benzyl 3-benzyloxycarbonylamino - N - 1',1' - dimethyl - 4'' - chlorophenethyl-L-succinamate.

EXAMPLE 33

When 7.78 parts of 4-chlorophenethylamine is allowed to react with 17.58 parts of β-benzyl N-benzyloxycarbonyl-L-aspartate by the procedure of Example 1, there is produced benzyl 3-benzyloxycarbonylamino-N-N'-chlorophenethyl-L-succinamate, which, after recrystallization from isopropyl acetate-cyclohexane, melts at about 121–122° and exhibits an optical rotation, in methanol, of —9.5°.

EXAMPLE 33

The reaction of 6.76 parts of N-methylphenethylamine with 17.58 parts of β-benzyl N-benzyloxycarbonyl-L-aspartate by the procedure of Example 1 affords benzyl 3 - benzyloxycarbonylamino - N - methyl - N phenethyl-L-succinamate as an oil, which exhibits an optical rotation, in methanol, of —22°.

EXAMPLE 34

The reaction of 4 parts of dl-1-methyl-2-(3'-indolyl)-ethylamine with 11 parts of N-benzyloxycarbonyl-L-aspartic acid α-p-nitrophenyl, β-benzyl diester by the procedure described in Example 2 results in benzyl 3-benzyloxycarbonylamino - N - [d-1' - methyl - 2'-(3''-indolylethyl)]-L-succinamate, which, after recrystallization from ethyl acetate, melts at about 158–162° and exhibits an optical rotation, in methanol, of +2° and benzyl 3-benzyloxycarbonylamino - N - [l - 1' - methyl - 2' - (3" - indolylethyl)]-L-succinamate, which, after recrystallization from isopropyl alcohol, melts at about 102–108° and exhibits an optical rotation, in methanol, of —15°.

EXAMPLE 35

The reaction of 8.86 parts of d-N-methylglucamine with 14.35 parts of N-benzyloxycarbonyl-L-aspartic acid α-p-nitrophenyl, β-benzyl diester by the procedure described in Example 2 affords benzyl 3-benzyloxycarbonylamino-N-methyl-N-d-glucosyl-L-succinamates an oil, displaying an optical rotation, in methanol, of —24.5°.

EXAMPLE 36

When 8.2 parts of D-N-methyl-1-methylphenethylamine is substituted in the procedure of Example 1, there is obtained, as an oil, benzyl 3-benzyloxycarbonylamino-N-methyl-N-D-1'-methylphenethyl-L-succinmate.

EXAMPLE 37

When 8.2 parts of L-N-methyl-1-methylphenethylamine is substituted in the procedure of Example 1, there is obtained, as an oil, benzyl 3-benzyloxycarbonylamino-N-methyl-N-D-1'-mthylphnethyl-L-succinamat.

EXAMPLE 38

The substitution of 8.52 parts of D-N-methyl-1-methyl-2-cyclohexylethylamine in the procedure of Example 1 results in benzyl 3-benzyloxycarbonylamino-N-methyl-N-D-1'-methyl-2' - cyclohexylethyl-L-succinamate, obtained as an oil.

EXAMPLE 39

The substitution of 8.52 parts of L-N-methyl-1-methyl-2-cyclohexylethylamine in the procedure of Example 1 results in benzyl 3-benzyloxycarbonylamino-N-methyl-N-L - 1'-methyl-2'-cyclohexylethyl-L-succinamate, obtained as an oil.

EXAMPLE 40

The reaction of 10 parts of DL-1-methyl-2-(2'-furyl)ethylamine hydrochloride with 30.15 parts of N-benzyloxycarbonyl-L-aspartic acid α-p-nitrophenyl, β-benzyl diester and 5.84 parts of triethylamine according to the procedure of Example 2 results in benzyl 3-benzyloxycarbonylamino-N-DL - 1' - methyl-2'-(2"-furyl)ethyl-L-succinamate.

EXAMPLE 41

When 6.49 parts of DL-1-methyl-3-ethoxy-n-propylamine is allowed to react with 19.8 parts of β-benzyl N-benzyloxycarbonyl-L-aspartate by the procedure described in Example 1, there is produced benzyl 3-benzyloxycarbonylamino-N-(DL-1'-methyl - 3' - ethoxy-n-propyl)-L-succinamate, melting at about 64–81° and exhibiting an optical rotation, in methanol, of —7.5°.

EXAMPLE 42

The reaction of 8.96 parts of DL-1-methyl-2-(3',4'-methylenedioxyphenyl)ethylamine with 17.58 parts of β-benzyl N-benzyloxycarbonyl-L-aspartate by the procedure described in Example 1 results in benzyl 3-benzyloxycarbonylamino-N-[DL - 1' - methyl-2'-(3",4"-methylenedioxyphenyl)ethyl]-L-succinamate, which, after recrystallization from isopropyl alcohol, melts at about 113–119° and exhibits an optical rotation, in chloroform, of +10°.

EXAMPLE 43

When 8.32 parts of 4-methoxyphenethylamine is allowed to react with 23.9 parts of N-benzyloxycarbonyl-L-aspartic acid α-p-nitrophenyl β-benzyl diester according to the procedure of Example 2, there is produced benzyl 3 - benzyloxycarbonylamino-N - 4'-methoxyphenethyl-L-succinamate, which after recrystallization from isopropyl acetate, melts at about 135.5–136.5°.

EXAMPLE 44

The reaction of 8.2 parts of DL-1-methyl-3-phenyl-n-propylamine with 23.9 parts of N-benzyloxycarbonyl-L-aspartic acid α-p-nitrophenyl β-benzyl diester by the procedure of Example 2 results in benzyl 3-benzyloxycarbonylamino-N-(DL - 1' - methyl-3'-phenyl-n-propyl)-L-succinamate, which, after recrystallization from ether-pentane, melts at about 97–115° and exhibits an optical rotation, in methanol, of —5.5°.

EXAMPLE 45

The reaction of 6.95 parts of 4-fluorophenethylamine with 23.9 parts of N-benzyloxycarbonyl-L-aspartic acid α-p-nitrophenyl, β-benzyl diester by the procedure described in Example 2 results in benzyl 3-benzyloxycarbonylamino-N-4'-fluorophenethyl-L-succinamate, which, after recrystallization from toluene, melts at about 106–108° and exhibits an optical rotation, in methanol, of —9°.

EXAMPLE 46

When 5.56 parts of 2-(2'-furyl)ethylamine is allowed to react with 23.9 parts of N-benzyloxycarbonyl-L-aspartic acid α-p-nitrophenyl β-benzyl diester by the procedure described in Example 2, there is produced benzyl 3-benzyloxycarbonylamino-N - [2' - (2" - furyl)ethyl]-L-succinamate, which, after recrystallization from isopropyl alcohol, melts at about 100–105° and exhibits an optical rotation, in methanol, of —10°.

EXAMPLE 47

The reaction of 6.85 parts of 2-phenoxyethylamine with 23.9 parts of N-benzyloxycarbonyl-L-aspartic acid α-p-nitrophenyl, β-benzyl diester by the procedure of Example 2 results in benzyl 3-benzyloxycarbonylamino-N-2'-phenoxyethyl-L-succinamate, which, after recrystallization from isopropyl acetate, melts at about 101–103° and exhibits an optical rotation of —5.5° in methanol.

EXAMPLE 48

When 4.48 parts of 1,1-dimethylphenethylamine is allowed to react with 14.34 parts of N-benzyloxycarbonyl-L-aspartic acid α-p-nitrophenyl, β-benzyl diester by the procedure described in Example 2, there is produced benzyl 3 - benzyloxycarbonylamine-N - 1',1' - dimethylphenethyl-L-succinamate.

EXAMPLE 49

When 4.72 parts of benzyl 3-benzyloxycarbonylamino-N-DL-2'-phenylcyclopropyl-L-succinamate is substituted in the procedure of Example 3, there is produced 3-amino-N-DL-2'-phenylcyclopropyl-L-succinamic acid, which, after recrystallization from aqueous isopropyl alcohol, melts at about 175–178° and exhibits an optical rotation, in methanol, of +5°.

EXAMPLE 50

The substitution of an equivalent quantity of the β-benzyl ester of N-benzyloxycarbonyl-L-aspartic acid α-DL-2-phenyl-3-methylmorpholine in the procedure of Example 3 results in L-aspartic acid α-DL - 2 - phenyl-3-methylmorpholide, which softens at about 145° and exhibits an optical rotation, in acetic acid, of —15.9°.

EXAMPLE 51

When an equivalent quantity of benzyl 3-benzyloxycarbonylamino-N-DL-1'-methylhexyl-L-succinamate is substituted in the procedure of Example 3, there is produced 3 - amino-N-DL-1'-methylhexyl-L-succinamic acid, which after recrystallization from water, melts at about 190–194° and exhibits an optical rotation, in acetic acid, of +6.9°.

EXAMPLE 52

When an equivalent quantity of benzyl 3-benzyloxycarbonylamino - N - DL-1'-methyl-4"-hydroxyphenethyl-L-succinamate is substituted in the procedure of Example 3, there is obtained 3-amino-N-DL-1'-methyl-4''-hydroxyphenethyl-L-succinamic acid, which softens at about 160° and exhibits an optical rotation, in water, of +5°

EXAMPLE 53

The substitution of an equivalent quantity of benzyl 3-benzyloxycarbonylamino-N-n-heptyl-L-succinamate in the procedure of Example 3 affords 3-amino-N-n-heptyl-L-succinamic acid, melting at about 186–188° and exhibiting an optical rotation, in methanol, of −8°.

EXAMPLE 54

By substituting an equivalent quantity of benzyl 3-benzyloxycarbonylamino - N - DL-1'-ethylpentyl-L-succinamate in the procedure of Example 3, there is obtained 3 - amino-N-DL-1'-ethylpentyl-L-succinamic acid, which after recrystallization from aqueous acetone, melts at about 201–202° and exhibits an optical rotation, in acetic acid, of +9°.

EXAMPLE 55

By substituting an equivalent quantity of benzyl 3-benzyloxycarbonylamino - N-DL-1',4'-dimethylpentyl-L-succinamate and otherwise proceeding according to the processes described in Example 3, there is produced 3-amino - N - DL-1',4'-dimethylpentyl-L-succinamic acid, melting at about 181–188° and displaying an optical rotation, in methanol, of −5°.

EXAMPLE 56

When an equivalent quantity of benzyl 3-benzyloxycarbonylamino-N-DL-1'-methylheptyl-L-succinamate is substituted in the procedure of Example 3, there is obtained, after recrystallization from aqueous acetone, 3-amino-N-DL-1'-methylheptyl-L-succinamic acid, melting at about 211–212° and displaying an optical rotation, in methanol, of −7.5°.

EXAMPLE 57

The substitution of an equivalent quantity of benzyl 3-benzyloxycarbonylamino - N - D-1',4'-dimethylpentyl-L-succinamate in the procedure of Example 3 results in 3-amino-N-D-1',4'-dimethylpentyl-L-succinamic acid, which, after recrystallization from aqueous methanol, melts at about 210–213° and displays an optical rotation, in methanol, of −3°.

EXAMPLE 58

When an equivalent quantity of benzyl 3-benzyloxycarbonylamino-N-D-1'-methylhexyl-L-succinamate is substituted in the procedure of Example 3, there is produced 3 - amino-N-D-1'-methylhexyl-L-succinamic acid, which, after recrystallization from aqueous methanol, melts at about 217–218° and displays an optical rotation, in 1 N hydrochloric acid, of +16°.

EXAMPLE 59

When an equivalent quantity of benzyl 3-benzyloxycarbonylamino-N-L-1'-methylhexyl-L-succinamate is substituted in the procedure of Example 3, there is obtained 3-amino-N-L-1'-methylhexyl-L-succinamic acid, which, after recrystallization from water, melts at about 187–189° and displays an optical rotation, in methanol, or −5°.

EXAMPLE 60

When an equivalent quantity of benzyl 3-benzyloxycarbonylamino - N - L-1',4'-dimethylpentyl-L-succinamate is substituted in the procedure of Example 3, there is obtained 3 - amino - N-L-1',4'-dimethylpentyl-L-succinamic acid, melting at about 187–190° and displaying an optical rotation, in water, of +20°.

EXAMPLE 61

The substitution of an equivalent quantity of benzyl 3-benzyloxycarbonylamino - N-2'-indanyl-L-succinamate in the procedure of Example 3, affords 3-amino-N-2'-indanyl-L-succinamic acid, which, after recrystallization from aqueous methanol, melts at about 214–224° and exhibits an optical rotation, in 1 N hydrochloric acid, of −5.5°.

EXAMPLE 62

When an equivalent quantity of benzyl 3-benzyloxycarbonylamino - N-DL-1',3'-dimethylpentyl-L-succinamate is substituted in the procedure of Example 3, there is produced, after recrystallization from water, 3-amino-N-DL-1',3'-dimethylpentyl-L-succinamic acid, melting at about 162–166° and exhibiting an optical rotation, in methanol, of −6°.

EXAMPLE 63

When an equivalent quantity of benzyl 3-benzyloxycarbonylamino - N - methyl-N-D-1'-methylphenethyl-L-succinamate is substituted in the procedure of Example 3, there is obtained 3-amino-N-methyl-N-D-1'-methylphenethyl-L-succinamic acid hemihydrate, melting at about 185–187° and displaying an optical rotation, in water, of +12°.

EXAMPLE 64

The substitution of an equivalent quantity of benzyl 3-benzyloxycarbonylamino - N-methyl-N-L-1'-methylphenethyl-L-succinamate in the procedure of Example 3 affords 3 - amino-N-methyl-N-L-1'-methylphenethyl-L-succinamic acid, melting at about 164–166° and displaying an optical rotation, in water, of +47°.

EXAMPLE 65

By substiuting an equivalent quantity of benzyl 3-benzyloxycarbonylamino - N-methyl-N-D-1'- methyl-2'-cyclohexylethyl-L-succinamate and otherwise proceeding according to the processes of Example 3, there is obtained 3-amino-N-methyl-N-D-1'-methyl-2' - cyclohexylethyl - L - succinamic acid, melting at about 194–196° and exhibiting an optical rotation, in water, of +1°.

EXAMPLE 66

The substitution of an equivalent quantity of benzyl 3-benzyloxycarbonylamino - N-methyl-N-L-1'-methyl-2'-cyclohexylethyl-L-succinamate in the procedure of Exampe 3 results in 3-amino-N-methyl-N-L-1'-methyl-2'-cyclohexylethyl-L-succinamic acid, which, after recrystallization from isopropyl alcohol-ether, metals at about 179–180° and exhibits an optical rotation, in water of =13.5°.

EXAMPLE 67

When an equivalent quantity of benzyl 3-benzyloxycarbonylamino-N-DL-1'-methyl-2'-(α-naphthyl)- ethyl-L-succinamate is hydrogenolyzed according to the procedure of Example 3, but utilizing 75% acetic acid as a solvent, 3 - amino - N - DL - 1-methyl-2'-(α-naphthyl)ethyl-L-succinamic acid, which, after recrystallization from methanol-ether, melts at about 156–160°, is produced.

EXAMPLE 68

The substitution of an equivalent quantity of benzyl 3-benzyloxycarbonylamino-N-DL-1'-methyl - 4'' - fluorophenethyl-L-succinamate in the procedure of Example 3 results in 3-amino-N-DL-1'-methyl-4''-fluorophenethyl-L-succinamic acid, which, after recrystallization from water, melts at about 202.5–204.5°.

EXAMPLE 69

By substituting an equivalent quantity of bendyl 3-benzyloxycarbonylamino-N-DL-1₂-methyl - 3'',4'' - dichlorophenethyl-L-succinamate and otherwise proceeding according to the processes of Example 3, there is produced 3-amino-N-DL - 1' - methyl-3'',4''-dichlorophenethyl-L-succinamic acid.

EXAMPLE 70

The substitution of an equivalent quantity of benzyl 3-benzyloxycarbonylamino-N-DL-1'-methyl - 4'' - chlorophenethyl-L-succinamate in the procedure of Example 3, results in 3-amino-N-DL-1'-methyl - 4"-chlorophenethyl-L-succinamic acid.

EXAMPLE 71

The substitution of an equivalent quantity of benzyl 3-benzyloxycarbonylamino-N-DL-1'-methyl-2'-(2" - furyl)ethyl-L-succinamate in the procedure of Example 3 results in 3 - amino - N-DL-1'-methyl-2'-(2"-furyl)ethyl-L-succinamic acid, which, after recrystallization from methanol-ether, melts at about 168–180°.

EXAMPLE 72

When an equivalent quantity of benzyl 3-benzyloxycarbonylamino-N-DL-2'-methylphenethyl-L - succinamate is substituted in the procedure of Example 3, there is produced 3 - amino-N-DL-2'-methylphenethyl-L-succinamic acid, which, after recrystallization from water, melts at about 182–188° with decomposition and displays an optical rotation, in water, of −15°.

EXAMPLE 73

When an equivalent quantity of benzyl 3-benzyloxycarbonylamino-N-(DL-1'-methyl-3'-ethoxy-n-propyl) - L-succinamate is substituted in the procedure of Example 3, there is obtained 3 - amino-N-(DL-1'-methyl-3'-ethoxy-n-propyl)-L-succinamic acid, which, after recrystallization from methanol-ether, melts at about 166–170° with decomposition and displays an optical rotation, in methanol, of +2.5°.

EXAMPLE 74

When an equivalent quantity of benzyl 3-benzyloxycarbonylamino - N - methyl-N-phenethyl-L-succinamate is substituted in the procedure of Example 3, there is produced 3-amino-N-methyl-N-phenethyl-L-succinamic acid, which, after recrystallization from methanol, melts at about 173–175° and displays an optical rotation, in methanol, of −31°.

EXAMPLE 75

When an equivalent quantity of benzyl 3-benzyloxycarbonylamino - N - [DL-1'-methyl-2'-(3",4"-methylenedioxyphenyl)ethyl]-L - succinamate is substituted in the procedure of Example 3, there is produced 3-amino-N-[DL-1'-methyl-2'-(3",4" - methylene-dioxyphenyl)ethyl]-L-succinamic acid, melting at about 189–192° with decomposition and exhibiting an optical rotation, in methanol, of +5.5°.

EXAMPLE 76

The substitution of an equivalent quantity of benzyl 3-benzyloxycarbonylamino - N - (DL-1'-methyl-3'-phenyl-n-propyl)-L-succinamate in the procedure of Example 3 results in 3-amino-N-(DL-1'-methyl-3'-phenyl-n-propyl)-L-succinamic acid, which, after recrystallization from aqueous methanol, melts at about 190–196° with decomposition and exhibits an optical rotation, in 0.1 N hydrochloric acid, of +15.5°.

EXAMPLE 77

When an equivalent quantity of benzyl 3-benzyloxycarbonylamino - N - 4'-methoxyphenethyl-L-succinamate is substituted in the procedure of Example 3 there is obtained 3 - amino-N-4-'-methoxyphenethyl-L - succinamic acid, which, after recrystallization from aqueous methanol, melts at about 211–213° with decomposition and exhibits an optical rotation, in 1 N hydrochloric acid, of −36°.

EXAMPLE 78

The substitution of an equivalent quantity of benzyl 3-benzyloxycarbonylamino - N - 4' - fluorophenethyl-L-succinamate in the procedure of Example 3 results in 3-amino - N - 4'-fluorophenethyl-L-succinamic acid, which, after recrystallization from water, melts at about 208–209° with decomposition and exhibits an optical rotation, in methanol, of −6°.

EXAMPLE 79

By substituting an equivalent quantity of benzyl 3-benzyloxycarbonylamino - N[2-(2'-furyl)ethyl]-L-succinamate and otherwise proceeding according to the processes of Example 3, there is obtained 3-amino-N-[2-(2'-furyl)ethyl]-L-succinamic acid, which, after recrystallization from methanol, melts at about 196° with decomposition and exhibits an optical rotation, in methanol, of −16.5°.

EXAMPLE 80

When an equivalent quantity of benzyl 3-benzyloxycarbonylamino - N - 1',1'-dimethyl-4"-chlorophenethyl-L-succinamate is hydrogenolyzed in 75% acetic acid by the procedure described in Example 3, there is produced 3-amino - N-1',1'-dimethyl-4"-chlorophenethyl-L-succinamic acid.

EXAMPLE 81

The hydrogenolysis of an equivalent quantity of benzyl 3 - benzyloxycarbonylamino - N-D-1'-methylphenethyl-L-succinamate in 75% acetic acid by the procedure described in Example 3 results in 3-amino-N-D-1'-methylphenethyl-L-succinamic acid, which, after recrystallization from aqueous ethanol, melts at about 222–225° with decomposition and exhibits an optical rotation, in water, of +14°.

EXAMPLE 82

When an equivalent quantity of benzyl 3-benzyloxycarbonylamino-N-L-1'-methylphenethyl-L-succinamate is hydrogenolyzed in 75% acetic acid by the procedure described in Example 3, there is obtained 3-amino-N-L-1'-methylphenethyl-L-succinamic acid, which, after recrystallization from water, melts at about 197–198° with decomposition and displays an optical rotation, in methanol, of −12°.

EXAMPLE 83

The hydrogenolysis of an equivalent quantity of benzyl 3-benzyloxycarbonylamino-N-phenethyl-L-succinamate in 75% acetic acid by the procedure described in Example 3 results in 3 - amino - N-phenethyl-L-succinamic acid, which, after recrystallization from aqueous isopropyl alcohol, melts at about 212–214° with decomposition and exhibits an optical rotation, in water, of −14.5°.

EXAMPLE 84

When an equivalent quantity of benzyl 3-benzyloxycarbonylamino - N-L-1'-methyl-2'-cyclohexylethyl-L-succinamate is hydrogenolyzed in 75% acetic acid according to the procedure described in Example 3, there is produced 3 - amino-N-L-1'-methyl-2'-cyclohexylethyl-L-succinamic acid, which, after recrystallization from aqueous ethanol, melts at about 184–185° with decomposition and exhibits an optical rotation, in methanol, of −19°.

EXAMPLE 85

When an equivalent quantity of benzyl 3-benzyloxycarbonylamino - N-methyl-N-*d*-glucosyl-L-succinamate is hydrogenolyzed in 75% acetic acid by the procedure described in Example 3, there is obtained, as a solid foam, 3-amino-N-methyl-N-*d*-glucosyl-L-succinamic acid, which exhibits an optical rotation of −20.5°, in water.

EXAMPLE 86

The hydrogenolysis of an equivalent quantity of benzyl 3 - benzyloxycarbonylamino-N-2'-cyclohexylethyl-L-succinamate in 75% acetic acid by the procedure described in Example 3 results in 3-amino-N-2'-cyclohexylethyl-L-succinamic acid, which, after recrystallization from aqueous methanol, melts at about 193–202° with decomposition and exhibits an optical rotation, in acetic acid, of −16.5°.

EXAMPLE 87

When an equivalent quantity of benzyl 3-benzyloxycarbonylamino - N-2'-(2"-pyridyl)ethyl-L-succinamate is hydrogenolyzed in 75% acetic acid by the procedure described in Example 3, there is obtained 3-amino-N-2'-(2''-pyridyl)ethyl-L-succinamic acid, which, after recrystallization from water, melts at about 200–202° with decomposition and exhibits an optical rotation, in water, of −15°.

EXAMPLE 88

When an equivalent quantity of benzyl 3-benzyloxycarbonylamino-N-DL-1'-ethylphenethyl-L-succinamate is hydrogenolyzed in 75% acetic acid by the procedure described in Example 3, there is produced 3-amino-N-DL-1'-ethylphenethyl-L-succinamic acid, which, after recrystallization from methanol-ether, melts at about 158–163° with decomposition and exhibits an optical rotation, in methanol, of +7.8°.

EXAMPLE 89

When an equivalent quantity of benzyl 3-benzyloxycarbonylamino-N-4'-hydroxyphenethyl-L-succinamate is hydrogenolyzed in 75% acetic acid by the procedure described in Example 3, there is produced 3-amino-N-4'-hydroxyphenethyl-L-succinamic acid, which, after recrystallization from water, melts at about 209–210° with decomposition and exhibits an optical rotation, in water, of −21°.

EXAMPLE 90

By substituting an equivalent quantity of D-1-methylcyclohexylethylamine and otherwise proceeding according to the processes described in Example 2, there is produced benzyl 3-benzyloxycarbonylamino-N-D-1'-methylcyclohexylethyl-L-succinamate, which, after recrystallization from hexane-ether, melts at about 69–81° and exhibits an optical rotation, in methanol, of +2.0°.

EXAMPLE 91

When an equivalent quantity of 1,1-dimethylphenethylamine is substituted in the procedure of Example 2, there is obtained an oily product, which is extracted with ether. The ether extract is stripped of solvent to afford, as an oil, benzyl 3-benzyloxycarbonylamino-N-1',1'-dimethylphenthyl-L-succinamate, exhibiting an optical rotation of −6°, in methanol.

EXAMPLE 92

When an equivalent quantity of DL-1-methyl-2-phenoxyethylamine is substituted in the procedure of Example 2, there is produced benzyl 3-benzyloxycarbonylamino-N-DL-1'-methyl-2'-phenoxyethyl-L-succinamate melting at about 76–88° and exhibiting an optical rotation, in chloroform, of +13.5°.

EXAMPLE 93

By substituting an equivalent quantity of DL-1-methyl-3-methoxy-n-propylamine and otherwise proceeding according to the processes of Example 2, there is obtained benzyl 3-benzyloxycarbonylamino-N-DL-1'-methyl-3'-methoxy-n-propyl-L-succinamate, which exhibits an optical rotation of −7.5° in methanol.

EXAMPLE 94

When an equivalent quantity of benzyl 3-benzyloxycarbonylamino-N-2'-phenoxyethyl-L-succinamate is substituted in the procedure of Example 3, except that 90% acetic acid is used as the solvent, 3,-amino-N-2'-phenoxyethyl-L-succinamic acid is produced. After recrystallization from water, that material melts with decomposition at 184–185° and exhibits an optical rotation, in 1 N hydrochloric acid, of −13°.

EXAMPLE 95

When an equivalent quantity of benzyl 3-benzyloxycarbonylamino-N-D-1'-methylcyclohexyl-L-succinamate is substituted in the procedure of Example 3, there is produced 3-amino-N-D-1'-methylcyclo-L-succinamic acid, which, after recrystallization from aqueous methanol, melts at about 207–208° with effervescence and exhibits an optical rotation, in methanol, of +16°.

EXAMPLE 96

The substitution of an equivalent quantity of benzyl 3-benzyloxycarbonylamino-N-1',1'-dimethylphenethyl-L-succinamate in the procedure of Example 3 affords 3-amino-N-1',1'-dimethylphenethyl-L-succinamic acid, which, after recrystallization from water, melts at about 159–161° and exhibits an optical rotation of −15.5° in methanol.

EXAMPLE 97

When an equivalent quantity of benzyl 3-benzyloxycarbonylamino-N-DL-1'-methyl-2'-phenoxyethyl-L-succinamate is substituted in the procedure of Example 3, there is produced, after recrystallization from aqueous methanol, 3-amino-N-DL-1'-methyl-2'-phenoxyethyl-L-succinamic acid, melting at about 180–184° with effervescence and exhibiting an optical rotation, in 1 N hydrochloric acid, of +10.5°.

EXAMPLE 98

When an equivalent quantity of L-2-amino-3-(4'-hydroxyphenyl)propanol is substituted in the procedure of Example 2, there is produced benzyl 3-benzyloxycarbonylamino-N-L-1-[4'-hydroxybenzyl)-2-hydroxy]ethyl-L-succinamate, melting at about 73–77°.

EXAMPLE 99

The substitution of an equivalent quantity of benzyl 3-benzyloxycarbonylamino-N-L-1-[(4'-hydroxybenzyl)-2-hydroxy]ethyl-L-succinamate in the procedure of Example 3 results in 3-amino-N-L-1-[(4'-hydroxybenzyl)-2-hydroxy]ethyl-L-succinamic acid, melting at about 212–213.5° with decomposition.

What is claimed is:

1. A compound of the formula

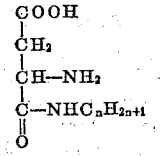

wherein $n$ is a positive integer greater than 6 and less than 9.

2. As in claim 1, a compound of the formula

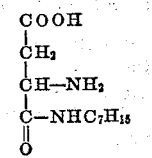

3. As in claim 1, the compound is 3-amino-N-DL-1'-methylhexyl-L-succinamic acid.

4. As in claim 1, the compound which is 3-amino-N-DL-1',4'-dimethylpentyl-L-succinamic acid.

5. As in claim 1, the compound which is 3-amino-N-L-1',4'-dimethylpentyl-L-succinamic acid.

6. As in claim 1, the compound which is 3-amino-N-L-1'-methylhexyl-L-succinamic acid.

References Cited

Liwschitz, Y. et al.: JACS, vol. 78 (3069–72), 1956.

LORRAINE A. WEINBERGER, Primary Examiner

P. J. KILLOS, Assistant Examiner

U.S. Cl. X.R.

99—79, 141 A; 260—247.2 A, 295 AM, 295 CA, 326.14 R, 332.2 A, 340.5, 347.3, 347.4, 468 E, 471 C, 482 C, 501.1, 514 J, 518 R, 518 A, 519, 534 M; 424—319